United States Patent
Xie et al.

(10) Patent No.: US 10,581,615 B2
(45) Date of Patent: Mar. 3, 2020

(54) BLOCKCHAIN-BASED IDENTITY AUTHENTICATION METHOD, DEVICE, NODE AND SYSTEM

(71) Applicant: CLOUDMINDS (SHENZHEN) ROBOTICS SYSTEMS CO., LTD., Shenzhen (CN)

(72) Inventors: Hui Xie, Shenzhen (CN); Jian Wang, Shenzhen (CN)

(73) Assignee: CLOUDMINDS (SHENXHEN) ROBOTICS) SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/318,284

(22) PCT Filed: Sep. 18, 2016

(86) PCT No.: PCT/CN2016/099254
§ 371 (c)(1),
(2) Date: Jan. 16, 2019

(87) PCT Pub. No.: WO2018/049656
PCT Pub. Date: Mar. 22, 2018

(65) Prior Publication Data
US 2019/0288854 A1    Sep. 19, 2019

(51) Int. Cl.
*H04L 9/32* (2006.01)
*H04L 9/06* (2006.01)
(Continued)

(52) U.S. Cl.
CPC ............ *H04L 9/3247* (2013.01); *G06F 21/33* (2013.01); *G06F 21/64* (2013.01); *H04L 9/0637* (2013.01);
(Continued)

(58) Field of Classification Search
CPC ..... H04L 63/08; H04L 9/0618; H04L 9/0866; H04L 2209/38; H04L 9/0637;
(Continued)

(56) References Cited

U.S. PATENT DOCUMENTS

| | | |
|---|---|---|
| 2016/0164884 A1 | 6/2016 | Sriram et al. |
| 2016/0253622 A1 | 9/2016 | Sriram et al. |

(Continued)

FOREIGN PATENT DOCUMENTS

| | | |
|---|---|---|
| CN | 104320262 A | 1/2015 |
| CN | 104683099 A | 6/2015 |

(Continued)

OTHER PUBLICATIONS

Xie, H, et al., "Study on Block Chain Technology and Its Applications," Netinfo Security, vol. 9, Sep. 2016, 4 pages. (Submitted with English Abstract).

(Continued)

*Primary Examiner* — Abiy Getachew
(74) *Attorney, Agent, or Firm* — McCoy Russell LLP

(57) ABSTRACT

The present disclosure discloses a method, apparatus, node, system for blockchain-based identity authentication. The method includes: receiving an authentication request sent by an authenticated party node; in the case that it is determined that the identity information of the authenticated party node and identity proof publishing node, and a digital signature of the identity proof publishing node on the identity information of the authenticated party node have been written into a blockchain, verifying the digital signature according to a public key of the identity proof publishing node; after the digital signature passes the verification, determining whether the authenticated party node has mastered a private key corresponding to the public key of the authenticated party node; and in the case that it is determined that the (Continued)

authenticated party node has mastered the private key, it is determined that the authenticated party node passes the identity authentication.

16 Claims, 11 Drawing Sheets

(51) Int. Cl.
 *H04L 9/30* (2006.01)
 *G06F 21/64* (2013.01)
 *H04L 9/08* (2006.01)
 *G06F 21/33* (2013.01)
 *H04L 29/06* (2006.01)

(52) U.S. Cl.
 CPC .............. *H04L 9/0891* (2013.01); *H04L 9/30* (2013.01); *H04L 9/3218* (2013.01); *H04L 9/3239* (2013.01); *H04L 63/08* (2013.01); *H04L 2209/38* (2013.01)

(58) Field of Classification Search
 CPC ....... H04L 9/0891; H04L 9/30; H04L 9/3218; H04L 9/3239; H04L 9/3247; G06F 17/10; G06F 17/30032; G06F 21/32; G06F 21/33; G06F 21/64
 See application file for complete search history.

(56) References Cited

U.S. PATENT DOCUMENTS

| 2016/0261690 | A1 | 9/2016 | Ford | |
| 2016/0342978 | A1* | 11/2016 | Davis | G06Q 20/02 |
| 2018/0285879 | A1* | 10/2018 | Gadnis | H04L 9/3231 |

FOREIGN PATENT DOCUMENTS

| CN | 105701372 A | 6/2016 |
| CN | 105719172 A | 6/2016 |
| CN | 105790954 A | 7/2016 |

OTHER PUBLICATIONS

ISA State Intellectual Property Office of the People's Republic of China, International Search Report Issued in Application No. PCT/CN2016/099254, dated Apr. 11, 2017, WIPO, 4 pages.

* cited by examiner

US 10,581,615 B2

BLOCKCHAIN-BASED IDENTITY AUTHENTICATION METHOD, DEVICE, NODE AND SYSTEM

CROSS-REFERENCE TO RELATED APPLICATIONS

The present application is a U.S. National Phase of International Patent Application Serial No. PCT/CN2016/099254 entitled "BLOCKCHAIN-BASED IDENTITY AUTHENTICATION METHOD, DEVICE, NODE AND SYSTEM," filed on Sep. 18, 2016. The entire contents of the above-cited application are hereby incorporated by reference in their entirety for all purposes.

FIELD OF THE INVENTION

The present disclosure relates to the field of information technology, and in particular, to a method, apparatus, blockchain-based identity authentication method and apparatus, a node, and a system.

BACKGROUND OF THE INVENTION

Identity authentication is a basic technical means for determining the identity of operators in computer and network systems and is a process of determining whether the identity of an object to be authenticated is true and effective. Commonly used identity authentication technologies in network systems include username/password, Kerberos (a network authentication protocol), and PKI (Public Key Infrastructure), and the like. These authentication means have one thing in common, that is, there is a third party organization that both of the two parties of authentication trust, identity information is published for the both authentication parties by the third party organization, and the identity information is used as the basis for determining the identity of the other party between both authentication parties.

However, such authentication mechanism as described above is prone to problems of affecting the availability and security of the entire system due to single point fault problem or security problem, this is because the fault of a certain or some nodes (for example, the both authentication parties or the trusted third party organization) in the system is likely to cause other nodes to fail to obtain the identity authentication information, and the address of the trusted third party organization in the network is usually fixed and is highly vulnerable to various attacks, and the security of the trusted third party organization is the basis of the security of the entire system, so that when the security of the trusted third party organization has problems, the security of the entire system cannot be guaranteed.

SUMMARY

The objective of the present disclosure is to provide a method, apparatus, node and system for blockchain-based identity authentication, for solving the problem that in the existing authentication mechanism, i.e., the availability and the security of the entire system is affected by a single point fault problem and a security problem.

In order to achieve the above objective, according to a first aspect of the embodiments of the present disclosure, the present disclosure provides a method for blockchain-based identity authentication, applied to an authenticating party node, comprising:

receiving an authentication request sent by an authenticated party node, wherein the authentication request includes the identity information of the authenticated party node and the identity information of an identity proof publishing node;

in the case that it is determined that the identity information of the authenticated party node, the identity information of the identity proof publishing node and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node;

after the first digital signature passes the verification, determining whether the authenticated party node has mastered a private key corresponding to the public key of the authenticated party node, wherein the public key of the authenticated party node is obtained according to the identity information of the authenticated party node; and in the case that it is determined that the authenticated party node has mastered the private key corresponding to the public key of the authenticated party node, it is determined that the authenticated party node passes the identity authentication.

Alternatively, after the first digital signature passes the verification, determining whether the authenticated party node has mastered a private key corresponding to the public key of the authenticated party node comprises:

after the first digital signature passes the verification, sending verification information to the authenticated party node;

receiving a second digital signature obtained by the authenticated party node by performing digital signature on the verification information according to the private key of the authenticated party node;

verifying the second digital signature according to the public key of the authenticated party node; and in the case that the second digital signature passes the verification, it is determined that the authenticated party node has mastered the private key corresponding to the public key of the authenticated party node.

Alternatively, after the first digital signature passes the verification, determining whether the authenticated party node has mastered a private key corresponding to the public key of the authenticated party node comprises:

receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node;

verifying whether the verification information is generated according to the information generation rule;

in the case that the verification information is generated according to the information generation rule, verifying the third digital signature according to the public key of the authenticated party node; and in the case that the third digital signature passes the verification, it is determined that the authenticated party node has mastered the private key corresponding to the public key of the authenticated party node.

Alternatively, in the case that there is a higher-level identity proof publishing node immediately higher than said identity proof publishing node, verifying the first digital signature according to a public key of the identity proof publishing node comprises:

obtaining a fourth digital signature from the blockchain, wherein the fourth digital signature is obtained by the higher-level identity proof publishing node by performing digital signature on the public key of said identity proof publishing node according to the private key of the higher-level identity proof publishing node;

verifying the fourth digital signature according to the public key of the higher-level identity proof publishing node, wherein the public key of the higher-level identity proof publishing node is obtained from the blockchain or is pre-stored; and after the fourth digital signature passes the verification, verifying the first digital signature according to the public key of said identity proof publishing node, wherein the public key of said identity proof publishing node is obtained from the blockchain or is pre-stored.

Alternatively, prior to, after the first digital signature passes the verification, determining whether the authenticated party node has mastered a private key corresponding to the public key of the authenticated party node, the method further comprises:

after the first digital signature passes the verification, obtaining a fourth digital signature from the blockchain, wherein the fourth digital signature is obtained by the higher-level identity proof publishing node by performing digital signature on the public key of said identity proof publishing node according to the private key of the higher-level identity proof publishing node;

verifying the fourth digital signature according to the public key of the higher-level identity proof publishing node, wherein the public key of the higher-level identity proof publishing node is obtained from the blockchain or is pre-stored; and after the fourth digital signature passes the verification, determining whether the authenticated party node has mastered the private key corresponding to the public key of the authenticated party node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

According to a second aspect of the embodiments of the present disclosure, a method for blockchain-based identity authentication is provided, applied to an authenticated party node, comprising:

sending an authentication request to an authenticating party node, wherein the authentication request includes the identity information of the authenticated party node and the identity information of an identity proof publishing node;

in the case that it is determined that the identity information of the authenticated party node, the identity information of the identity proof publishing node and a first digital signature obtained by the identity proof publishing node by performing digital signature on the identity information of the authenticated party node have been written into a blockchain, and after the first digital signature passes the verification of the authenticating party node, performing verification with the authenticating party node to determine whether the authenticated party node has mastered a private key corresponding to a public key of the authenticated party node; and in the case that the authenticating party node determines that the authenticated party node has mastered the private key corresponding to the public key of the authenticated party node, it is determined that the authenticated party node passes the identity authentication.

Alternatively, after the first digital signature passes the verification of the authenticating party node, performing verification with the authenticating party node to determine whether the authenticated party node has mastered a private key corresponding to a public key of the authenticated party node comprises:

after the first digital signature passes the verification of the authenticating party node, receiving verification information sent by the authenticating party node;

performing digital signature on the verification information according to the private key of the authenticated party node to obtain a second digital signature; and sending the second digital signature to the authenticating party node, and in the case that the second digital signature passes the verification of the authenticating party node, it is determined that the authenticated party node has mastered the private key corresponding to the public key of the authenticated party node.

Alternatively, after the first digital signature passes the verification of the authenticating party node, performing verification with the authenticating party node to determine whether the authenticated party node has mastered a private key corresponding to a public key of the authenticated party node comprises:

after the first digital signature passes the verification of the authenticating party node, generating verification information according to a preset information generation rule, wherein the information generation rule is preset in the authenticated party node and the authenticating party node;

performing digital signature on the verification information according to the private key of the authenticated party node to obtain a third digital signature;

sending the verification information and the third digital signature to the authenticating party node; and in the case that the authenticating party node determines that the verification information is generated according to the information generation rule, and the verification of the authenticating party node on the third digital signature according to the public key of the authenticated party node is passed, it is determined that the authenticated party node has mastered the private key corresponding to the public key of the authenticated party node.

Alternatively, the method of the identity proof publishing node to write the identity information of the authenticated party node and the first digital signature in the blockchain comprises:

writing an identity proof request into the blockchain, wherein the identity proof request includes the identity information of the authenticated party node and is used by the identity proof publishing node to determine the identity information of the authenticated party node in the blockchain, performing digital signature on the identity information of the authenticated party node according to the private key of the identity proof publishing node to obtain the first digital signature, and writing the first digital signature into the blockchain.

Alternatively, after the identity proof publishing node writes a revocation proof of revoking the first digital signature into the blockchain, the first digital signature of the authenticated party node is revoked, the revocation proof includes revocation description of the first digital signature, and a fifth digital signature obtained by performing digital signature on the revocation description through the private key of the identity proof publishing node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

According to a third aspect of the embodiments of the present disclosure, an apparatus for blockchain-based identity authentication is provided, applied to an authenticating party node, comprising:

a receiving module, configured for receiving an authentication request sent by an authenticated party node, wherein the authentication request includes the identity information of the authenticated party node and the identity information of an identity proof publishing node;

a first verification module, configured for, in the case that it is determined that the identity information of the authenticated party node, the identity information of the identity proof publishing node, and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node;

a second verification module, configured for, after the first digital signature passes the verification, determining whether the authenticated party node has mastered a private key corresponding to the public key of the authenticated party node, wherein the public key of the authenticated party node is obtained according to the identity information of the authenticated party node; and a determination module, configured for, in the case that it is determined that the authenticated party node has mastered the private key corresponding to the public key of the authenticated party node, determining that the authenticated party node passes the identity authentication.

Alternatively, the second verification module comprises:

a sending submodule, configured for, after the first digital signature passes the verification, sending verification information to the authenticated party node;

a receiving submodule, configured for receiving a second digital signature obtained by the authenticated party node by performing digital signature on the verification information according to the private key of the authenticated party node;

a verification submodule, configured for verifying the second digital signature according to the public key of the authenticated party node; and a determination submodule, configured for, in the case that it is determined that the second digital signature passes the verification, determining that the authenticated party node has mastered the private key corresponding to the public key of the authenticated party node.

Alternatively, the second verification module comprises:

a receiving submodule, configured for receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node;

an information verification submodule, configured for verifying whether the verification information is generated according to the information generation rule;

a signature verification submodule configured for, in the case that the verification information is generated according to the information generation rule, verifying the third digital signature according to the public key of the authenticated party node; and a determination submodule configured for, in the case that the third digital signature passes the verification, determining that the authenticated party node has mastered the private key corresponding to the public key of the authenticated party node.

Alternatively, in the case that there is a higher-level identity proof publishing node immediately higher than said identity proof publishing node, the first verification module is configured for:

obtaining a fourth digital signature from the blockchain, wherein the fourth digital signature is obtained by the higher-level identity proof publishing node by performing digital signature on the public key of said identity proof publishing node according to the private key of the higher-level identity proof publishing node, wherein the public key of the higher-level identity proof publishing node is obtained from the blockchain or is pre-stored;

verifying the fourth digital signature according to the public key of the higher-level identity proof publishing node; and after the fourth digital signature passes the verification, verifying the first digital signature according to the public key of said identity proof publishing node, wherein the public key of the identity proof publishing node is obtained from the blockchain or is pre-stored.

Alternatively, the first verification module is configured for:

after the first digital signature passes the verification, obtaining a fourth digital signature from the blockchain, wherein the fourth digital signature is obtained by the higher-level identity proof publishing node by performing digital signature on the public key of the identity proof publishing node according to the private key of the higher-level identity proof publishing node; and verifying the fourth digital signature according to the public key of the higher-level identity proof publishing node, wherein the public key of the higher-level identity proof publishing node is obtained from the blockchain or is pre-stored; and the sending module is further configured for, after the fourth digital signature passes the verification, the second verification module is configured for determining whether the authenticated party node has mastered the private key corresponding to the public key of the authenticated party node by the second verification module.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

According to a fourth aspect of the embodiments of the present disclosure, an apparatus for blockchain-based identity authentication is provided, applied to an authenticated party node, comprising:

an authentication request module, configured for sending an authentication request to an authenticating party node, wherein the authentication request includes the identity information of the authenticated party node and the identity information of an identity proof publishing node; and a verification module, configured for, after the authenticating party node determines that the identity information of the authenticated party node, the identity information of the identity proof publishing node and a first digital signature obtained by the identity proof publishing node by performing digital signature on the identity information of the authenticated party node have been written into a blockchain, and after the first digital signature passes the verification of the authenticating party node, performing verification with the authenticating party node to determine whether the authenticated party node has mastered a private key corresponding to a public key of the authenticated party node; and in the case that the authenticating party node determines that the authenticated party node has mastered the private key corresponding to the public key of the authenticated party node, the authenticated party node passes the identity authentication.

Alternatively, the verification module includes:

a receiving submodule configured for, after the first digital signature passes the verification of the authenticating party node, receiving verification information sent by the authenticating party node;

a signature submodule, configured for performing digital signature on the verification information according to the private key of the authenticated party node to obtain a second digital signature; and a sending submodule, configured for sending the second digital signature to the authenticating party node, and in the case that the second digital signature passes the verification of the authenticating party node, it is determined that the authenticated party node has mastered the private key corresponding to the public key of the authenticated party node.

Alternatively, the verification module includes:

an information generation submodule, configured for, after the first digital signature passes the verification of the authenticating party node, generating verification information according to a preset information generation rule, wherein the information generation rule is preset in the authenticated party node and the authenticating party node;

a signature submodule, configured for performing digital signature on the verification information according to the private key of the authenticated party node to obtain a third digital signature; and a sending submodule, configured for sending the verification information and the third digital signature to the authenticating party node; and in the case that the authenticating party node determines that the verification information is generated according to the information generation rule, and the verification of the authenticating party node on the third digital signature according to the public key of the authenticated party node is passed, it is determined that the authenticated party node has mastered the private key corresponding to the public key of the authenticated party node.

Alternatively, the apparatus further includes an identity proof request module, configured for:

writing an identity proof request into the blockchain, wherein the identity proof request includes the identity information of the authenticated party node and is used by the identity proof publishing node to determine the identity information of the authenticated party node in the blockchain, performing digital signature on the identity information of the authenticated party node according to the private key of the identity proof publishing node to obtain the first digital signature, and writing the first digital signature into the blockchain.

Alternatively, after the identity proof publishing node writes a revocation proof of revoking the first digital signature into the blockchain, the first digital signature of the authenticated party node is revoked, the revocation proof includes revocation description of the first digital signature, and a fifth digital signature obtained by performing digital signature on the revocation description through the private key of the identity proof publishing node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

According to a fifth aspect of the embodiments of the present disclosure, a non-transitory computer readable storage medium is provided. The non-transitory computer readable storage medium includes one or more programs, and said one or more programs are configured for executing the method of the first aspect.

According to a sixth aspect of the embodiments of the present disclosure, a user node is provided. The user node includes:

the non-transitory computer readable storage medium of the fifth aspect; and one or more processors configured for executing the program in the non-transitory computer readable storage medium.

According to a seventh aspect of the embodiments of the present disclosure, a non-transitory computer readable storage medium is provided. The non-transitory computer readable storage medium includes one or more programs, and said one or more programs are configured for executing the method of the second aspect.

According to an eighth aspect of the embodiments of the present disclosure, a user node is provided. The user node includes:

the non-transitory computer readable storage medium of the seventh aspect; and one or more processors configured for executing the program in the non-transitory computer readable storage medium.

According to a ninth aspect of the embodiments of the present disclosure, a system for identity authentication is provided, including:

a blockchain;

at least one user node of the sixth aspect, serving as an authenticating party node;

at least one user node of the eighth aspect, serving as an authenticated party node; and at least one identity proof publishing node;

wherein said blockchain, said at least one user node of the sixth aspect, said at least one user node of the eighth aspect and said at least one identity proof publishing node belong to the same blockchain network.

Alternatively, said at least one identity proof publishing node includes an identity proof publishing node, and the identity proof publishing node is configured for publishing an identity proof of the first user node to the blockchain; the first user node is any user node; and wherein the identity proof publishing node publishing the identity proof of the first user node to the blockchain includes: the identity proof publishing node determining the identity information of the first user node in the blockchain, performing digital signature on the identity information of the first user node by using a private key of the identity proof publishing node, and writing the obtained digital signature into the blockchain.

Alternatively, said at least one identity proof publishing node at least includes an identity proof publishing node and a higher-level identity proof publishing node immediately higher than said identity proof publishing node, the identity proof publishing node is configured for publishing the identity proof of the first user node to the blockchain, the first user node is any user node, and the higher-level identity proof publishing node is configured for publishing the identity proof of the identity proof publishing node to the blockchain; and wherein the identity proof publishing node publishing the identity proof of the first user node to the blockchain includes: the identity proof publishing node determines the identity information of the first user node in the blockchain, performs digital signature on the identity information of the first user node by using a private key of the identity proof publishing node, and writes the obtained digital signature into the blockchain; and the higher-level identity proof publishing node publishing the identity proof of the identity proof publishing node to the blockchain includes: the higher-level identity proof publishing node performing digital signature on a public key of the identity proof publishing node according to the private key of the higher-level identity proof publishing node, and writing the obtained digital signature into the blockchain.

Alternatively, the system includes a plurality of identity proof publishing subsystems, and each identity proof publishing subsystem includes at least one identity proof publishing node and at least one user node;

wherein in the case that the first identity proof publishing subsystem includes an identity proof publishing node, the identity proof publishing node is configured for publishing the identity proof of the first user node of the first identity proof publishing subsystem to the blockchain, and the first user node is any user node in the first identity proof publishing subsystem; and the first identity proof publishing subsystem is any identity proof publishing subsystem in the plurality of identity proof publishing subsystems;

in the case that the first identity proof publishing subsystem at least includes an identity proof publishing node and a higher-level identity proof publishing node of the identity proof publishing node, the identity proof publishing node is configured for publishing the identity proof of the first user node of the first identity proof publishing subsystem to the blockchain, and the higher-level identity proof publishing node is used for publishing the identity proof of the identity proof publishing node to the blockchain;

wherein the identity proof publishing node publishing the identity proof of the first user node of the first identity proof publishing subsystem to the blockchain includes: the identity proof publishing node determining the identity information of the first user node in the blockchain, performing digital signature on the identity information of the first user node according to the private key of the identity proof publishing node, and writing the obtained digital signature into the blockchain; and the higher-level identity proof publishing node publishing the identity proof of the identity proof publishing node to the blockchain includes: the higher-level identity proof publishing node performing digital signature on a public key of the identity proof publishing node according to the private key of the higher-level identity proof publishing node, and writing the obtained digital signature into the blockchain.

Through the above technical solutions, since both of the identity information of the authenticated party node and the identity information of the identity proof publishing node are recorded in the blockchain, the situation that the identity information cannot be obtained due to the fault of a certain one or some nodes does not occur, so the influence of a single point fault on the entire system may be avoided. Moreover, in the blockchain network, since as long as any node is configured with the private key of the identity proof publishing node, its role is an identity authentication publishing node, thus the identity proof publishing node is not a fixed node, and an attacker cannot position the identity proof publishing node, and the identity proof publishing node cannot be attached, so that the security of the entire system is ensured. The problem that the availability and the security of the entire system are affected by a single point fault problem and a security problem may be solved, and the availability and the security of the entire system are ensured.

Other features and advantages of the present disclosure will be described in detail in the following detailed description.

BRIEF DESCRIPTION OF THE DRAWINGS

The drawings used for providing a further understanding of the present disclosure, constitute a part of the specification and are used for explaining the present disclosure together with the following detailed description, but do not constitute limitations to the present disclosure. In the drawings.

DETAILED DESCRIPTION OF THE EMBODIMENTS

Figure 1:
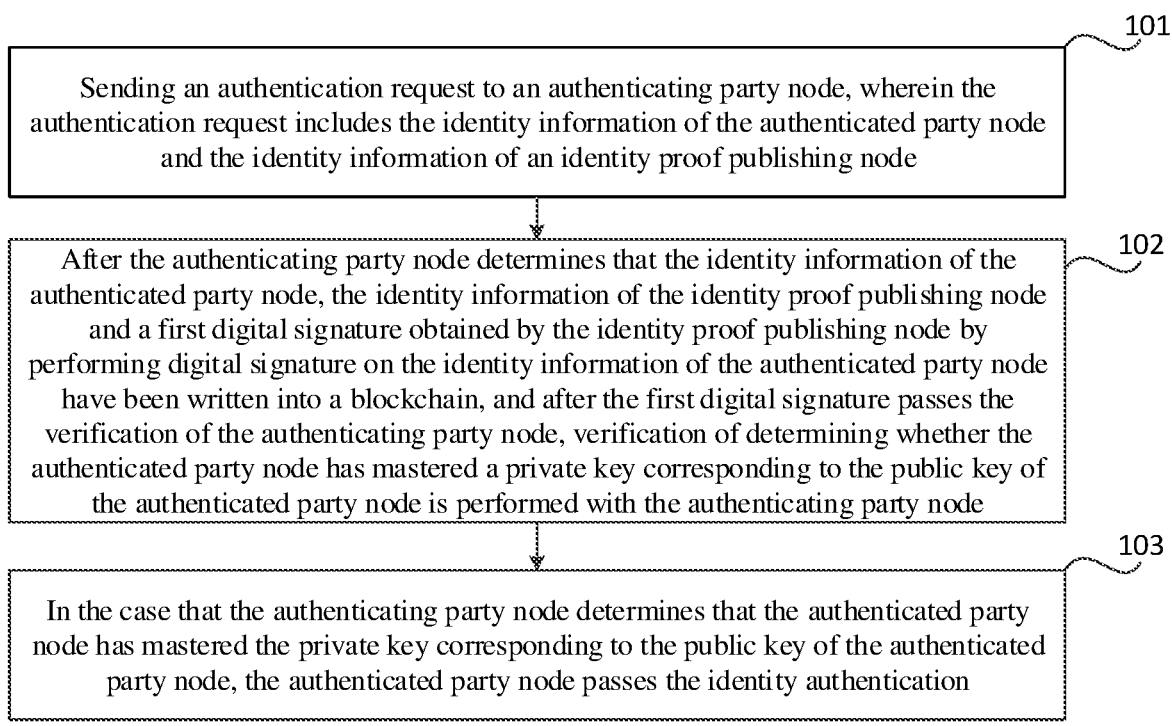
FIG. 1 is a flowchart of a method for blockchain-based identity authentication shown according to an embodiment.

The specific embodiments of the present disclosure will be described in detail below with reference to the drawings. It should be understood that the specific embodiments described herein are merely used for illustrating and explaining the present disclosure rather than limiting the present disclosure.

Before the method for blockchain-based identity authentication provided by the present disclosure is described, an application scenario involved in various embodiments of the present disclosure is introduced at first.

Firstly, the blockchain is introduced. The blockchain is a decentralized distributed database system in which all nodes in a blockchain network participate in the maintenance. The blockchain consists of a series of data blocks generated based on the cryptography method, and each data block is a block in the blockchain. According to the sequence of generation time, the blocks are linked together orderly to form a data chain, which is vividly called the blockchain. Some concepts of a blockchain network are introduced below.

A node in a blockchain network may be referred to as a blockchain node, wherein the blockchain network is based on a P2P (Peer to Peer) network, and each P2P network node participating in the transaction, block storage, verification, and forwarding is a node in the blockchain network.

The user identity in the blockchain may be represented by a public key or an account address generated based on the public key, and the public key and a private key appear in pairs, wherein the private key is mastered by a user and is not published to the above blockchain network. The public key or the account address may be randomly published to the blockchain network. The public key may become the account address through a specific hash and encoding. It is worth mentioning that there is no one-to-one correspondence between a user identity and a blockchain node, and a user can use his/her private key at any blockchain node.

With respect to the data writing of the blockchain, a blockchain node writes data to the blockchain by publishing a transaction to the blockchain network. The transaction includes: a transaction data packet generated by the blockchain node according to a preset transaction data format, and a digital signature performed on the transaction data packet by using the private key of the blockchain node, wherein the digital signature is used for proving the identity of the user of the blockchain node; thereafter, the transaction is recorded in the new block generated by "miners" (i.e., the blockchain nodes that implement a PoW (Proof Of Work) consensus competition mechanism) in the blockchain network, and the transaction is published to the blockchain network. After the transaction passes the verification performed by other blockchain nodes (the other nodes may obtain the public key of the blockchain node from the transaction generated by the blockchain node and verifies the digital signature according to the public key of the blockchain node, and the other nodes may also verify whether the transaction data packet is a specified data structure in addition to verifying the digital signature) and is accepted, the transaction is written into the blockchain. The new block in the blockchain is periodically generated by the above "miners" by executing the PoW consensus competition mechanism (this mechanism may be understood as follows: for example, the "miners" calculate random numbers together according to preset random number requirement which is an example of preset technical requirements of blocks, and the block generated by the "miner" which calculates the random number meeting the random number requirement at first is used as the new block), therefore the time interval for generating the new block is usually related to the above-mentioned preset technical requirements, and the time interval of the blockchain to generate the new block can be changed by setting different preset technical requirements.

In various embodiments disclosed by the present invention, the process of writing data into the blockchain is performed by using the above process. The application scenario involved in the various embodiments disclosed by the present invention may be an identity authentication system. The system is based on a blockchain, and may include at least: a blockchain, two or more user nodes and an identity proof publishing node, and the blockchain, the user nodes and the identity proof publishing node belong to the same blockchain network. The user node is a demand node for identity proof, and is used for actually performing an identity authentication operation. The identity proof publishing node is a node used for publishing the identity proof for the user node. The "publishing the identity proof" herein refers to verifying and performing digital signature on the identity information of the user node and writing the digital signature into the blockchain, moreover, in the blockchain network, the identity proof publishing node may not be a fixed node, and as long as any node is configured with a private key of the identity proof publishing node, its role is an identity authentication publishing node. In general, (an account address or a public key) of the identity information of the identity proof publishing node has been written into the blockchain and is accepted by the user node.

FIG. 1 is a flowchart of a method for blockchain-based identity authentication shown according to an embodiment. The method is applied to an authenticated party node, and the authenticated party node may be any user node in the above identity authentication system. With reference to FIG. 1, the method may include the following steps.

Step 101: an authentication request is sent to an authenticating party node, wherein the authentication request includes the identity information of the authenticated party node and the identity information of an identity proof publishing node.

The authenticating party node also can be any user node other than the authenticated party node in the above system, that is, the method for identity authentication is performed between two user nodes, and each user node may not only serve as the authenticated party node, but also may serve as the authenticating party node. In addition, the identity information of the authenticated party node includes an account address of the authenticated party node or a public key of the authenticated party node, and the account address of the authenticated party node is obtained according to the public key of the authenticated party node. The identity information of the identity proof publishing node includes the account address of the identity proof publishing node or the public key of the identity proof publishing node, and the account address of the identity proof publishing node is obtained according to the public key of the identity proof publishing node. The account addresses of the nodes may be generated by performing specific hash calculation and encoding on the public keys.

Step 102, after the authenticating party node determines that the identity information of the authenticated party node, the identity information of the identity proof publishing node and a first digital signature obtained by the identity proof publishing node by performing digital signature on the identity information of the authenticated party node have been written into a blockchain, and after the first digital signature passes the verification of the authenticating party node, verification of determining whether the authenticated party node has mastered a private key corresponding to the public key of the authenticated party node is performed with the authenticating party node.

Step 103, in the case that the authenticating party node determines that the authenticated party node has mastered the private key corresponding to the public key of the authenticated party node, the authenticated party node passes the identity authentication.

Figure 2:
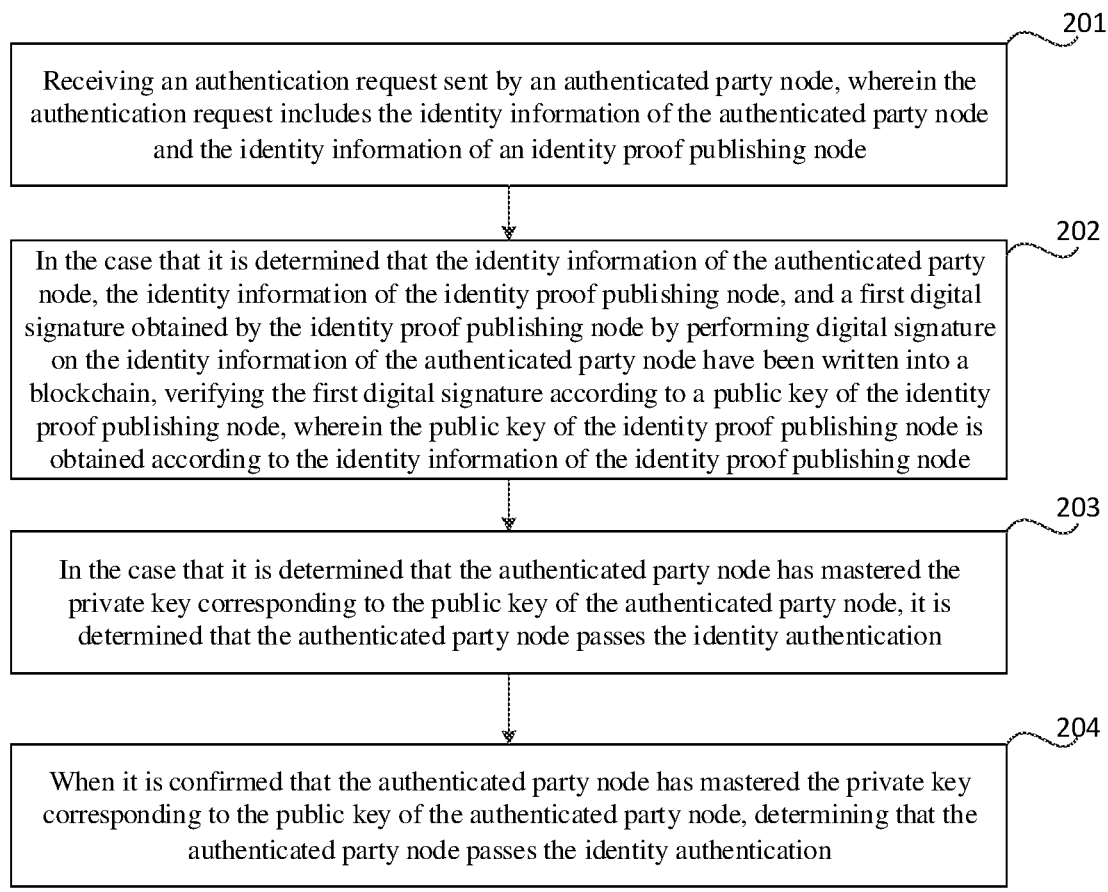
FIG. 2 is a flowchart of a method for blockchain-based identity authentication shown according to an embodiment.

FIG. 2 is a flowchart of a method for blockchain-based identity authentication shown according to an embodiment. The method is applied to an authenticating party node, and the authenticating party node may be any user node in the above identity authentication system. With reference to FIG. 2, the method may include the following steps.

Step 201, an authentication request sent by an authenticated party node is received, wherein the authentication request includes the identity information of the authenticated party node and the identity information of an identity proof publishing node.

The authenticated party node also can be any user node other than the authenticating party node in the above system, that is, the method for identity authentication is performed between two user nodes, and each user node may not only serve as the authenticated party node, but also may serve as the authenticating party node. In addition, the contents included in the identity information of the authenticated party node and the identity information of the identity proof publishing node may refer to step 101 and will not be repeated redundantly.

Step 202, in the case that it is determined that the identity information of the authenticated party node, the identity information of the identity proof publishing node, and a first digital signature obtained by the identity proof publishing node by performing digital signature on the identity information of the authenticated party node have been written into a blockchain, the first digital signature is verified according to a public key of the identity proof publishing node; and the public key of the identity proof publishing node is obtained according to the identity information of the identity proof publishing node.

Step 203, after the first digital signature passes the verification, determining whether the authenticated party node has mastered a private key corresponding to the public key of the authenticated party node, wherein the public key of the authenticated party node is obtained according to the identity information of the authenticated party node.

Step 204, in the case that it is determined that the authenticated party node has mastered the private key corresponding to the public key of the authenticated party node, it is determined that the authenticated party node passes the identity authentication.

Figure 3:
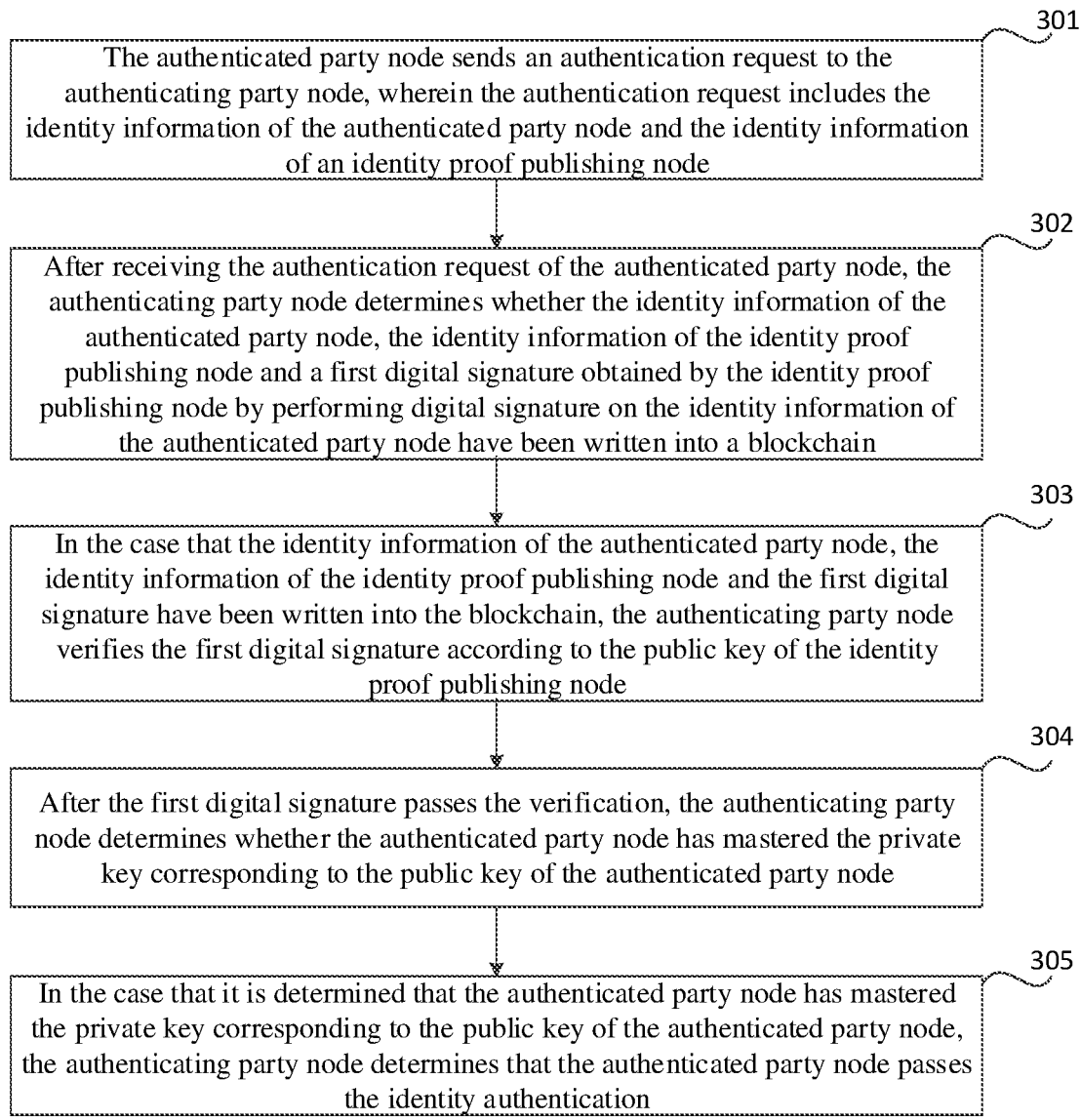
FIG. 3 is a flowchart of another method for blockchain-based identity authentication shown according to an embodiment.

FIG. 3 is a flowchart of another method for blockchain-based identity authentication shown according to an embodiment. The method is applied to the above identity authentication system, an authenticated party node and an authenticating party node in the present embodiment are user nodes in the authentication system. With reference to FIG. 3, the method may include the following steps.

Step 301: the authenticated party node sends an authentication request to the authenticating party node, wherein the authentication request includes the identity information of the authenticated party node and the identity information of an identity proof publishing node.

The authenticating party node and the authenticated party node may be any two user nodes in the above identity authentication system. The identity information of the authenticated party node includes an account address of the authenticated party node or a public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node. The account addresses of the nodes may be generated by performing specific hash calculation and encoding on the public keys.

Step 302, after receiving the authentication request of the authenticated party node, the authenticating party node determines whether the identity information of the authenticated party node, the identity information of the identity proof publishing node and a first digital signature obtained by the identity proof publishing node by performing digital signature on the identity information of the authenticated party node have been written into a blockchain.

As the authenticating party node, the authenticated party node and the identity proof publishing node belong to the same blockchain network, in the case that the identity information of the authenticated party node, the identity information of the identity proof publishing node and the first digital signature have been written into the blockchain, the authenticating party node may read above information from the blockchain. The first digital signature is generated after the identity proof publishing node publishes the identity proof of the authenticated party node to the blockchain. The method of the identity proof publishing node to publish the identity proof of the authenticated party node to the blockchain may include the following steps:

Firstly, the authenticated party node writes an identity proof request into the blockchain, wherein the identity proof request includes the identity information of the authenticated party node. The process of writing the identity proof request into the blockchain may refer to the data writing process of the blockchain as described above.

Secondly, after receiving the identity proof request, the identity proof publishing node determines the identity information of the authenticated party node in the blockchain (for example, determines that the identity information of the authenticated party node has been written into the blockchain), and performs digital signature on the identity information of the authenticated party node according to the private key of the identity proof publishing node to obtain the first digital signature.

Finally, the first digital signature is written into the blockchain. After the first digital signature is written into the blockchain, all nodes in the blockchain network may read the first digital signature, therefore the publishing of the identity proof of the authenticated party node is completed.

In addition, it is worth mentioning that the flow of the identity proof publishing node to publish the identity proof of the authenticated party node to the blockchain should be prior to the flow in which the authenticated party node initiates identity authentication to the authenticating party node. Moreover, the action of writing the identity proof request into the blockchain is not limited to the above authenticated party node, and any user node in the blockchain network could initiate to write the identity proof request into the blockchain.

Step 303, in the case that the identity information of the authenticated party node, the identity information of the identity proof publishing node and the first digital signature have been written into the blockchain, the authenticating party node verifies the first digital signature according to the public key of the identity proof publishing node.

Since the first digital signature is obtained by performing digital signature on the identity information of the authenticated party node according to the private key of the identity proof publishing node, the first digital signature may be verified according to the public key of the identity proof publishing node to determine the legality of the first digital signature, wherein the public key of the identity proof publishing node may be obtained from the blockchain and may also be pre-stored on the authenticating party node. Since the identity information of the identity proof publishing node has been written into the blockchain, any node in the blockchain network may obtain the identity information, therefore, if the identity information is the public key of the identity proof publishing node, the authenticating party node may obtain the public key of the identity proof publishing node directly, and if the identity information is the account address of the identity proof publishing node, the authenticating party node may perform calculation according to the account address to obtain the public key of the identity proof publishing node.

Step 304, after the first digital signature passes the verification, the authenticating party node determines whether the authenticated party node has mastered the private key corresponding to the public key of the authenticated party node.

Figure 4:
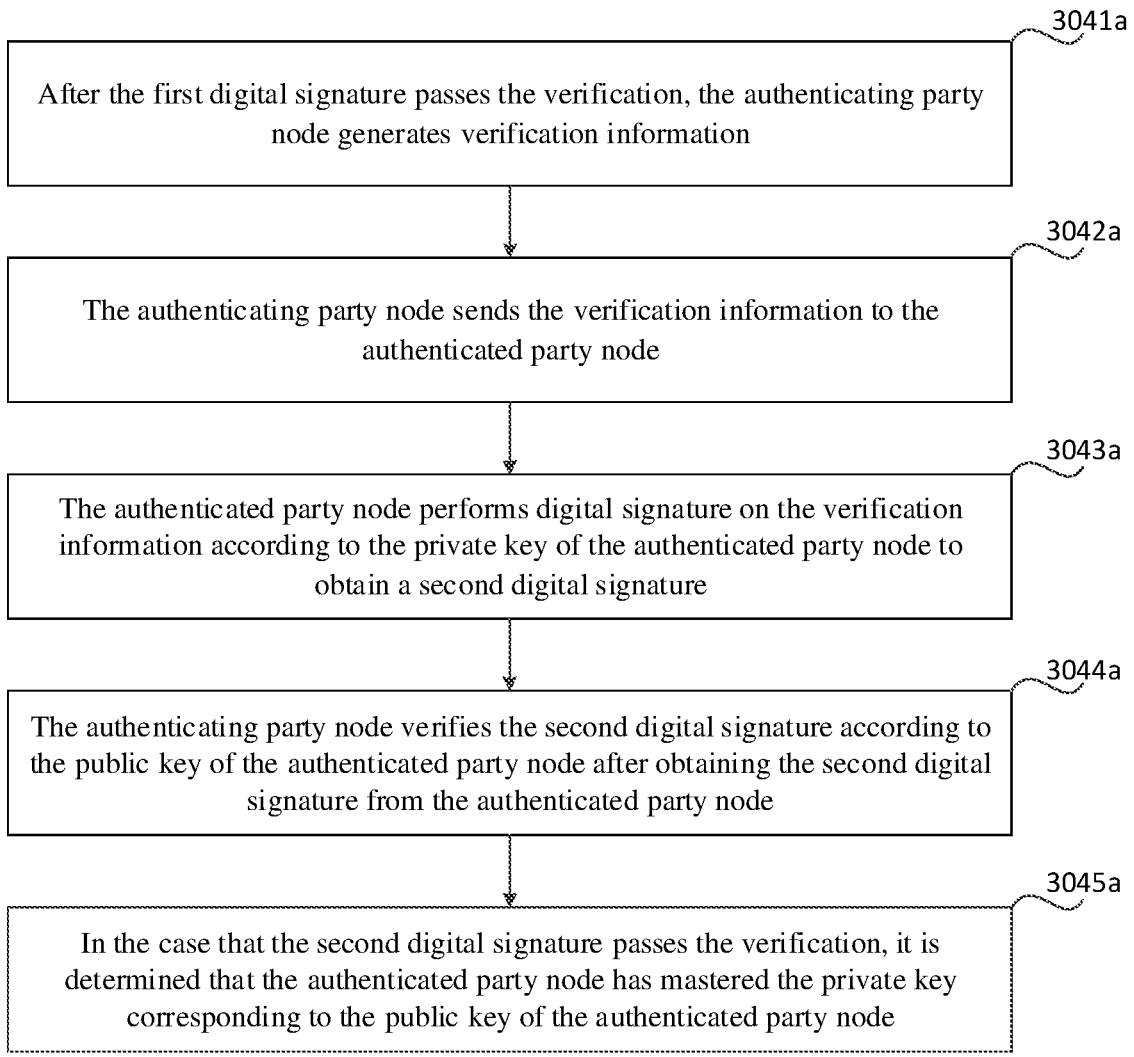
FIG. 4 is a flowchart of a method for private key verification shown according to the embodiment as shown in FIG. 3.

Exemplarily, FIG. 4 is a flowchart of a method for private key verification shown according to the embodiment as shown in FIG. 3. As shown in FIG. 4, in an embodiment, whether the authenticated party node has mastered the private key corresponding to the public key of the authenticated party node may be determined via the following steps:

Step 3041a, after the first digital signature passes the verification, the authenticating party node generates verification information. The verification information may be a challenge code, which is also called a challenge password, and refers to a group of encrypted passwords generated following the challenge handshake authentication protocol (abbreviated as CHAP), which is used for ensuring that a real password of the user is not leaked in a transmission process. Or, the verification information may be information generated according to a preset information generation rule.

Step 3042a, the authenticating party node sends the verification information to the authenticated party node.

Step 3043a, the authenticated party node performs digital signature on the verification information according to the private key of the authenticated party node to obtain a second digital signature.

Step 3044a, the authenticating party node verifies the second digital signature according to the public key of the authenticated party node after obtaining the second digital signature from the authenticated party node. The public key of the authenticated party node may be obtained from the blockchain and may also be pre-stored in the authenticating party node.

Step 3045a, in the case that the second digital signature passes the verification, it is determined that the authenticated party node has mastered the private key corresponding to the public key of the authenticated party node.

Figure 5:
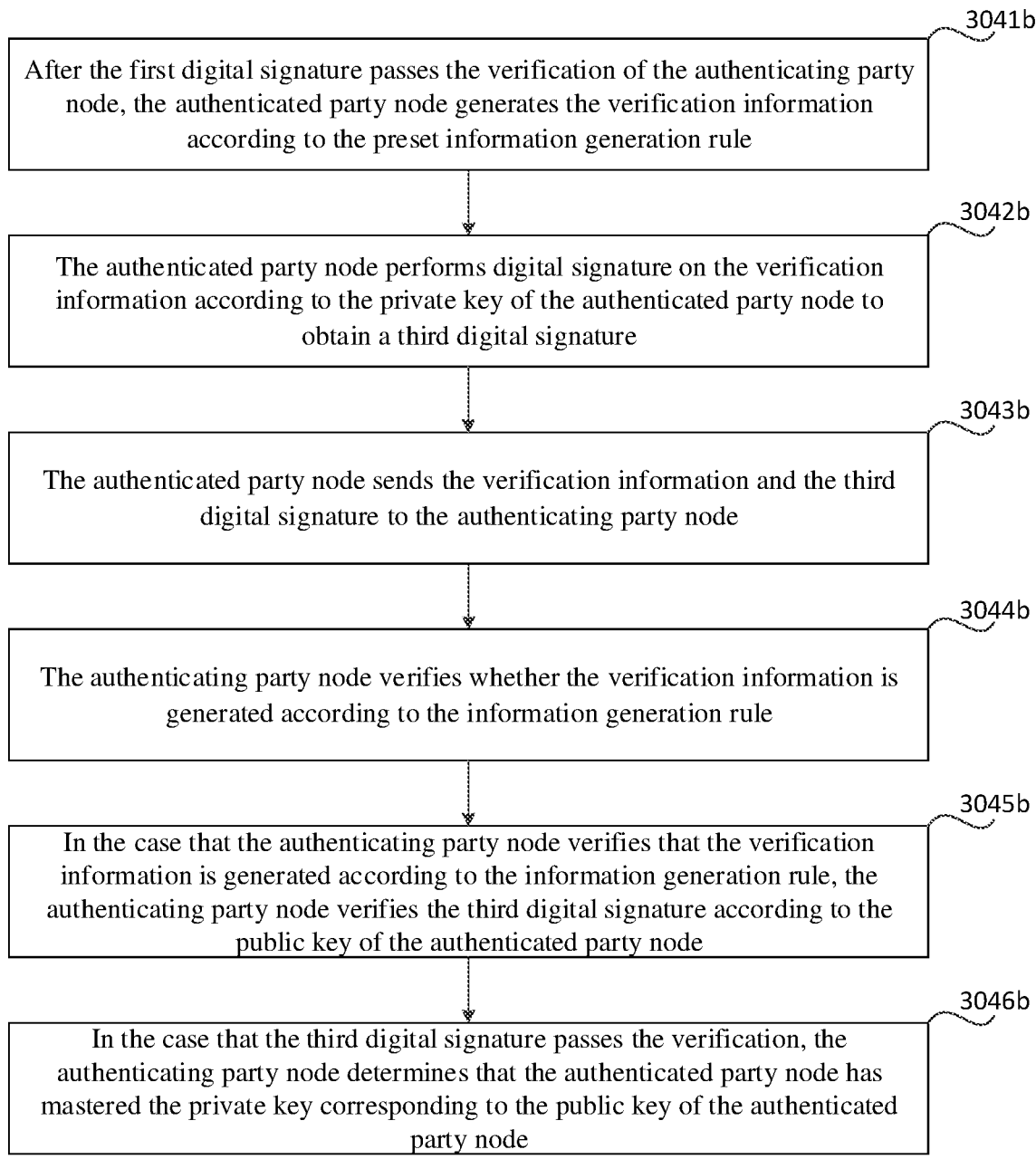
FIG. 5 is a flowchart of another method for private key verification shown according to the embodiment as shown in FIG. 3.

FIG. 5 is a flowchart of another method for private key verification shown according to the embodiment as shown in FIG. 3. As shown in FIG. 5, in another embodiment, whether the authenticated party node has mastered the private key corresponding to the public key of the authenticated party node may be determined via the following steps:

Step 3041b, after the first digital signature passes the verification of the authenticating party node, the authenticated party node generates the verification information according to the preset information generation rule.

The verification information may be the same as the verification information in the step 3041a, and the information generation rule is preset in the authenticated party node and the authenticating party node.

Step 3042b, the authenticated party node performs digital signature on the verification information according to the private key of the authenticated party node to obtain a third digital signature.

Step 3043b, the authenticated party node sends the verification information and the third digital signature to the authenticating party node.

Step 3044b, the authenticating party node verifies whether the verification information is generated according to the information generation rule.

Step 3045b, in the case that the authenticating party node verifies that the verification information is generated according to the information generation rule, the authenticating party node verifies the third digital signature according to the public key of the authenticated party node. The public key of the authenticated party node may be obtained from the blockchain and may also be pre-stored in the authenticating party node.

Step 3046b, in the case that the third digital signature passes the verification, the authenticating party node determines that the authenticated party node has mastered the private key corresponding to the public key of the authenticated party node.

In addition to the foregoing embodiment as shown in FIG. 4 or FIG. 5, whether the authenticated party node has mastered the private key corresponding to the public key of the authenticated party node may also be determined in other possible embodiments, including, but not limited to the above solutions.

Step 305, in the case that it is determined that the authenticated party node has mastered the private key corresponding to the public key of the authenticated party node, the authenticating party node determines that the authenticated party node passes the identity authentication.

If any of the above steps 303 and 304 fails the verification, the identity authentication of the authenticated party node is determined as a failure.

Alternatively, in the case that there is a higher-level identity proof publishing node immediately higher than above mentioned identity proof publishing node, verifying the first digital signature according to the public key of the identity proof publishing node obtained from the blockchain in step 303 may include:

Firstly, obtaining the public key of the higher-level identity proof publishing node and a fourth digital signature from the blockchain, wherein the fourth digital signature is obtained by the higher-level identity proof publishing node by performing digital signature on the public key of said identity proof publishing node according to the private key of the higher-level identity proof publishing node.

Secondly, verifying the fourth digital signature according to the public key of the higher-level identity proof publishing node.

Thirdly, after the fourth digital signature passes the verification, verifying the first digital signature according to the public key of the identity proof publishing node obtained from the blockchain.

Or, in the case that there is a higher-level identity proof publishing node immediately higher than said identity proof publishing node, prior to the step 304, that is, after the first digital signature passes the verification, determining whether the authenticated party node has mastered the private key corresponding to the public key of the authenticated party node, the method may include:

Firstly, after the first digital signature passes the verification, obtaining the public key of the higher-level identity proof publishing node and the fourth digital signature from the blockchain, wherein the fourth digital signature is obtained by the higher-level identity proof publishing node by performing the digital signature on the public key of the identity proof publishing node according to the private key of the higher-level identity proof publishing node.

Secondly, verifying the fourth digital signature according to the public key of the higher-level identity proof publishing node.

Thirdly, after the fourth digital signature passes the verification, sending a challenge code to the authenticated party node.

In the actual application scenario, there may be a further higher-level identity proof publishing node immediately higher than said higher-level identity proof publishing node, and is referred to herein as further-higher-level identity proof publishing node. After the fourth digital signature is verified, the digital signature on the public key of the higher-level identity proof publishing node by the further-higher-level identity proof publishing node by using its own private key also needs to be verified. Of course, a further higher-level identity proof publishing node of the further-higher-level identity proof publishing node may also exist, and its principle is the same as that of the foregoing method, and so on, and will not be enumerated one by one.

In addition, alternatively, the identity proof publishing node may also revoke the published identity proof. Exemplarily, the identity proof publishing node may write a revocation proof into the blockchain, and the process of writing the revocation proof may refer to the data writing process of the blockchain. The revocation proof may include a certain previously published identity proof, for example, the above first digital signature is revoked, and a fifth digital signature obtained by performing digital signature on the revocation description by using the private key of the identity proof publishing node. The other nodes in the blockchain network may verify the fifth digital signature through the public key of the identity proof publishing node so as to determine the legality of the revocation proof.

In summary, in the method for blockchain-based identity authentication provided by the present disclosure, since both of the identity information of the authenticated party node and the identity information of the identity proof publishing node are recorded in the blockchain, the situation that the identity information cannot be obtained due to the fault of a certain one or some nodes does not occur, so that the influence of a single point fault on the entire system may be avoided. Moreover, in the blockchain network, since as long as any node is configured with the private key of the identity proof publishing node, its role is an identity authentication publishing node, thus the identity proof publishing node is not a fixed node, and an attacker cannot position the identity proof publishing node, and the identity proof publishing node cannot be attached, so that the security of the entire system is ensured. The problem that the availability and the security of the entire system are affected by a single point fault problem and a security problem may be solved, and the availability and the security of the entire system are ensured.

Figure 6:
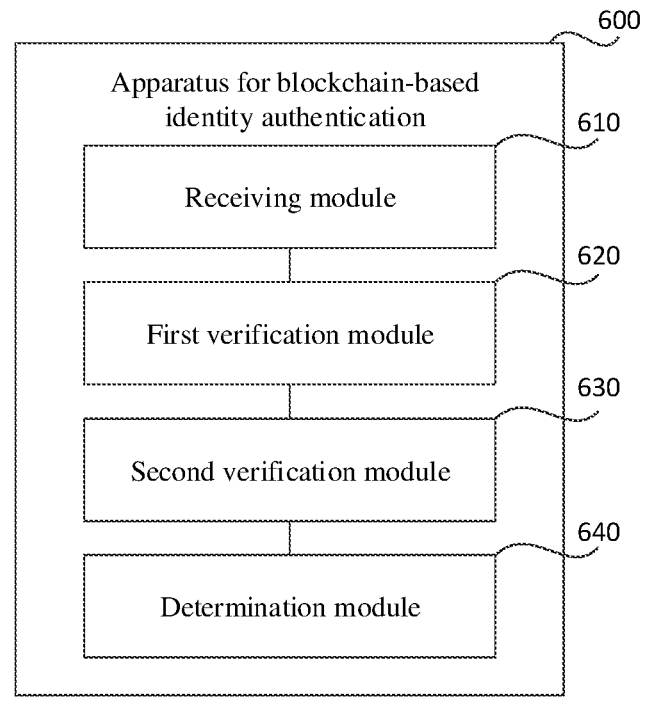
FIG. 6 is a block diagram of an apparatus for blockchain-based identity authentication shown according to an embodiment.

FIG. 6 is a block diagram of an apparatus for blockchain-based identity authentication shown according to an embodiment. The apparatus 600 may be applied to an authenticating party node for executing the method shown in any one of FIG. 2 or FIG. 3 to FIG. 5. With reference to FIG. 6, the apparatus 600 includes a receiving module 610, a first verification module 620, a second verification module 630 and a determination module 640. Wherein:

The receiving module 610 is configured for receiving an authentication request sent by an authenticated party node, wherein the authentication request includes the identity information of the authenticated party node and the identity information of an identity proof publishing node.

The first verification module 620 is configured for, in the case that it is determined that the identity information of the authenticated party node, the identity information of the identity proof publishing node, and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node.

The second verification module 630 is configured for, after the first digital signature passes the verification, determining whether the authenticated party node has mastered a private key corresponding to the public key of the authenticated party node, wherein the public key of the authenticated party node is obtained according to the identity information of the authenticated party node.

The determination module 640 is configured for, in the case that it is determined that the authenticated party node has mastered the private key corresponding to the public key of the authenticated party node, determining that the authenticated party node passes the identity authentication.

Figure 7:
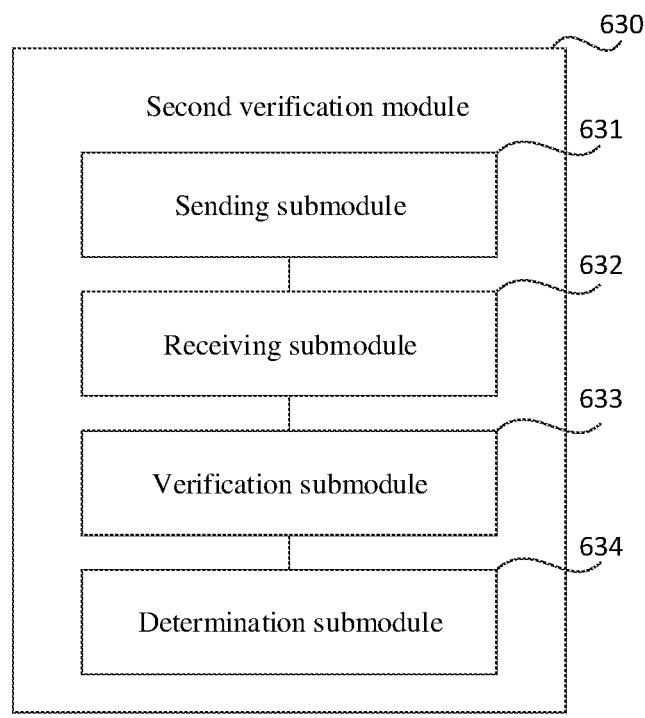
FIG. 7 is a block diagram of a second verification module shown according to the embodiment as shown in FIG. 6.

Alternatively, FIG. 7 is a block diagram of the second verification module shown according to the embodiment as shown in FIG. 6. As shown in FIG. 7, the second verification module 630 includes:

a sending submodule 631, configured for, after the first digital signature passes the verification, sending verification information to the authenticated party node;

a receiving submodule 632, configured for receiving a second digital signature obtained by the authenticated party node by performing digital signature on the verification information according to the private key of the authenticated party node;

a verification submodule 633, configured for verifying the second digital signature according to the public key of the authenticated party node; and a determination submodule 634, configured for, in the case that it is determined that the second digital signature passes the verification, determining that the authenticated party node has mastered the private key corresponding to the public key of the authenticated party node.

Figure 8:
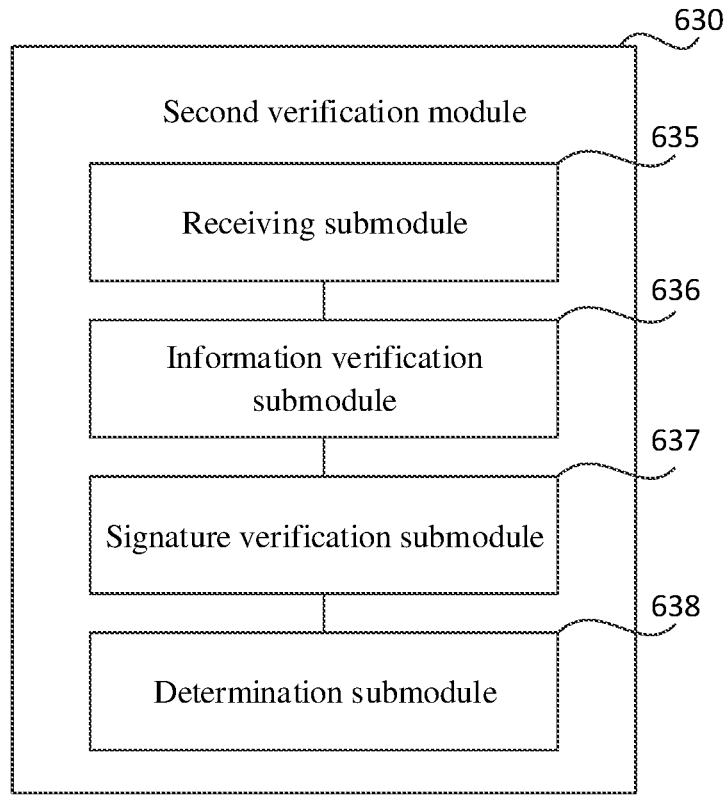
FIG. 8 is a block diagram of another second verification module shown according to the embodiment as shown in FIG. 6.

Alternatively, FIG. 8 is a block diagram of another second verification module shown according to the embodiment as shown in FIG. 6, and as shown in FIG. 8, the second verification module 630 includes:

a receiving submodule 635, configured for receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node;

an information verification submodule 636, configured for verifying whether the verification information is generated according to the information generation rule;

a signature verification submodule 637, configured for, in the case that the verification information is generated according to the information generation rule, verifying the third digital signature according to the public key of the authenticated party node; and a determination submodule 638, configured for, in the case that the third digital signature passes the verification, determining that the authenticated party node has mastered the private key corresponding to the public key of the authenticated party node.

Alternatively, in the case that there is a higher-level identity proof publishing node immediately higher than said identity proof publishing node, the first verification module 620 is configured for:

obtaining the public key of the higher-level identity proof publishing node and a fourth digital signature from the blockchain, wherein the fourth digital signature is obtained by the higher-level identity proof publishing node by performing digital signature on the public key of said identity proof publishing node according to the private key of the higher-level identity proof publishing node;

verifying the fourth digital signature according to the public key of the higher-level identity proof publishing node; and after the fourth digital signature passes the verification, verifying the first digital signature according to the public key of said identity proof publishing node obtained from the blockchain.

Alternatively, the first verification module 620 is configured for:

after the first digital signature passes the verification, obtaining the public key of the higher-level identity proof publishing node and a fourth digital signature from the blockchain, wherein the fourth digital signature is obtained by the higher-level identity proof publishing node by performing digital signature on the public key of said identity proof publishing node according to the private key of the higher-level identity proof publishing node; verifying the fourth digital signature according to the public key of the higher-level identity proof publishing node; and the sending module is further configured for, after the fourth digital signature passes the verification, the second verification module 630 is configured for determining whether the authenticated party node has mastered the private key corresponding to the public key of the authenticated party node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

Figure 9:
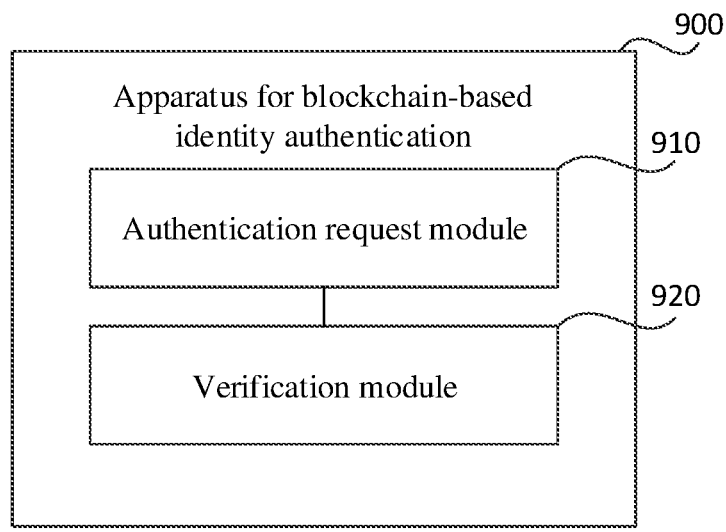
FIG. 9 is a block diagram of another apparatus for blockchain-based identity authentication shown according to an embodiment.

FIG. 9 is a block diagram of another apparatus for blockchain-based identity authentication shown according to an embodiment. The apparatus 900 may be applied to an authenticating party node for executing the method shown in any one of FIG. 1 or FIG. 3 to FIG. 5. With reference to FIG. 9, the apparatus 900 includes an authentication request module 910 and a verification module 920. Wherein:

The authentication request module 910 is configured for sending an authentication request to an authenticating party node, wherein the authentication request includes the identity information of the authenticated party node and the identity information of an identity proof publishing node.

The verification module 920 is configured for, after the authenticating party node determines that the identity information of the authenticated party node, the identity information of the identity proof publishing node and a first digital signature obtained by the identity proof publishing node by performing digital signature on the identity information of the authenticated party node have been written into a blockchain, and after the first digital signature passes the verification of the authenticating party node, performing verification with the authenticating party node to determine whether the authenticated party node has mastered a private key corresponding to a public key of the authenticated party node; and in the case that the authenticating party node determines that the authenticated party node has mastered the private key corresponding to the public key of the authenticated party node, the authenticated party node passes the identity authentication.

Figure 10:
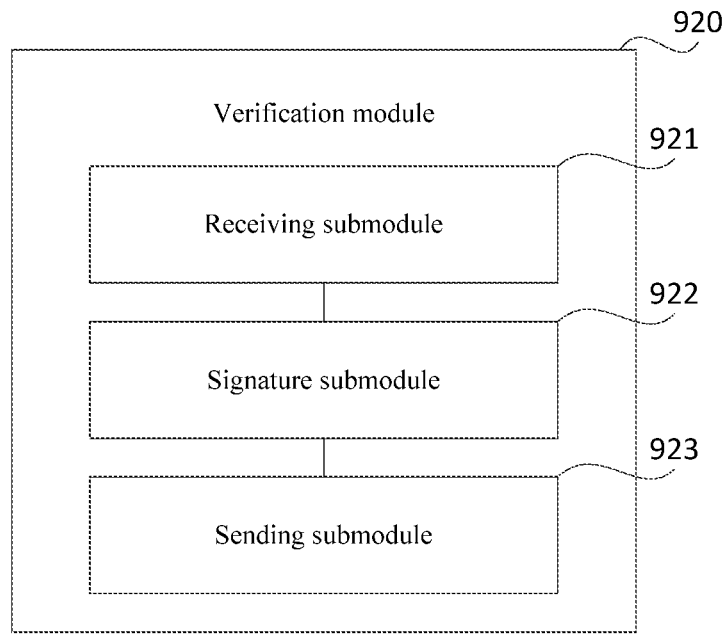
FIG. 10 is a block diagram of a verification module shown according to the embodiment as shown in FIG. 9.

Alternatively, FIG. 10 is a block diagram of a verification module shown according to the embodiment as shown in FIG. 9, and as shown in FIG. 10, the verification module 920 includes:

a receiving submodule 921, configured for, after the first digital signature passes the verification of the authenticating party node, receiving verification information sent by the authenticating party node;

a signature submodule 922, configured for performing digital signature on the verification information according to the private key of the authenticated party node to obtain a second digital signature; and a sending submodule 923, configured for sending the second digital signature to the authenticating party node, and in the case that the second digital signature passes the verification of the authenticating party node, it is determined that the authenticated party node has mastered the private key corresponding to the public key of the authenticated party node.

Figure 11:
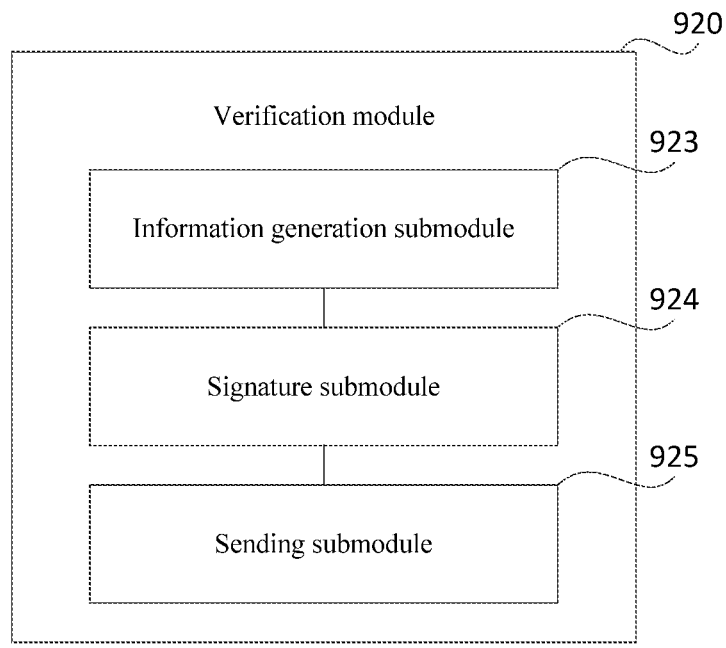
FIG. 11 is a block diagram of another verification module shown according to the embodiment as shown in FIG. 9.

Alternatively, FIG. 11 is a block diagram of another verification module shown according to the embodiment as shown in FIG. 9, and as shown in FIG. 11, the verification module 920 includes:

an information generation submodule 923, configured for, after the first digital signature passes the verification of the authenticating party node, generating verification information according to a preset information generation rule, wherein the information generation rule is preset in the authenticated party node and the authenticating party node;

a signature submodule 924, configured for performing digital signature on the verification information according to the private key of the authenticated party node to obtain a third digital signature; and a sending submodule 925, configured for sending the verification information and the third digital signature to the authenticating party node, and in the case that the authenticating party node determines that the verification information is generated according to the information generation rule, and the verification of the authenticating party node on the third digital signature according to the public key of the authenticated party node is passed, it is determined that the authenticated party node has mastered the private key corresponding to the public key of the authenticated party node.

Figure 12:
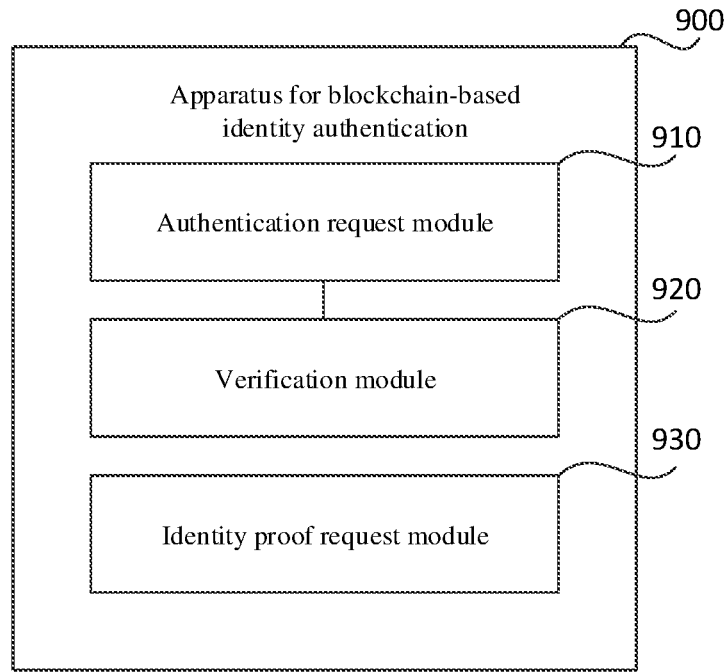
FIG. 12 is a block diagram of yet another apparatus blockchain-based identity authentication shown according to an embodiment.

Alternatively, FIG. 12 is a block diagram of yet another apparatus for blockchain-based identity authentication shown according to an embodiment. The apparatus 900 further includes an identity proof request module 930, configured for:

writing an identity proof request into the blockchain, wherein the identity proof request includes the identity information of the authenticated party node and is used by the identity proof publishing node to determine the identity information of the authenticated party node in the blockchain, performing digital signature on the identity information of the authenticated party node according to the private key of the identity proof publishing node to obtain the first digital signature, and writing the first digital signature into the blockchain.

Alternatively, after the identity proof publishing node writes a revocation proof of revoking the first digital signature into the blockchain, the first digital signature of the authenticated party node is revoked. The revocation proof includes revocation description of the first digital signature, and a fifth digital signature obtained by performing digital signature on the revocation description through the private key of the identity proof publishing node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

In summary, since both of the identity information of the authenticated party node and the identity information of the identity proof publishing node are recorded in the blockchain, the situation that the identity information cannot be obtained due to the fault of a certain one or some nodes does not occur, so that the influence of a single point fault on the entire system may be avoided. Moreover, in the blockchain network, since as long as any node is configured with the private key of the identity proof publishing node, its role is an identity authentication publishing node, so the identity proof publishing node is not a fixed node, and an attacker cannot position the identity proof publishing node. In this way, the identity proof publishing node cannot be attached, so that the security of the entire system is ensured, the problem that the availability and the security of the entire system are affected by a single point fault problem and a security problem may be solved, and the availability and the security of the entire system are ensured.

The embodiment of the present disclosure further discloses a non-transitory computer readable storage medium 1, the non-transitory computer readable storage medium 1 includes one or more programs, said one or more programs are configured for executing a method for blockchain-based identity authentication, the method for blockchain-based identity authentication is applied to an authenticating party node, and the method for blockchain-based identity authentication includes: receiving an authentication request sent by an authenticated party node, wherein the authentication request includes the identity information of the authenticated party node and the identity information of an identity proof publishing node; in the case that it is determined that the identity information of the authenticated party node, the identity information of the identity proof publishing node, and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node; after the first digital signature passes the verification, determining whether the authenticated party node has mastered a private key corresponding to the public key of the authenticated party node, wherein the public key of the authenticated party node is obtained according to the identity information of the authenticated party node; and in the case that it is determined that the authenticated party node has mastered the private key corresponding to the public key of the authenticated party node, determining that the authenticated party node passes the identity authentication.

Alternatively, after the first digital signature passes the verification, determining whether the authenticated party node has mastered a private key corresponding to the public key of the authenticated party node includes: after the first digital signature passes the verification, sending verification information to the authenticated party node; receiving a second digital signature obtained by the authenticated party node by performing digital signature on the verification information according to the private key of the authenticated party node; verifying the second digital signature according to the public key of the authenticated party node; and in the case that the second digital signature passes the verification, determining that the authenticated party node has mastered the private key corresponding to the public key of the authenticated party node.

Alternatively, after the first digital signature passes the verification, determining whether the authenticated party node has mastered a private key corresponding to the public key of the authenticated party node includes: receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node; verifying whether the verification information is generated according to the information generation rule; in the case that the verification information is generated according to the information generation rule, verifying the third digital signature according to the public key of the authenticated party node; and in the case that the third digital signature passes the verification, determining that the authenticated party node has mastered the private key corresponding to the public key of the authenticated party node.

Alternatively, in the case that there is a higher-level identity proof publishing node immediately higher than said identity proof publishing node, verifying the first digital signature according to a public key of the identity proof publishing node includes:

obtaining the public key of the higher-level identity proof publishing node and a fourth digital signature from the blockchain, wherein the fourth digital signature is obtained by the higher-level identity proof publishing node by performing digital signature on the public key of said identity proof publishing node according to the private key of the higher-level identity proof publishing node; verifying the fourth digital signature according to the public key of the higher-level identity proof publishing node; and after the fourth digital signature passes the verification, verifying the first digital signature according to the public key of the identity proof publishing node.

Alternatively, prior to, after the first digital signature passes the verification, determining whether the authenticated party node has mastered a private key corresponding to the public key of the authenticated party node, the method further includes: after the first digital signature passes the verification, obtaining the public key of the higher-level identity proof publishing node and a fourth digital signature from the blockchain, wherein the fourth digital signature is obtained by the higher-level identity proof publishing node by performing digital signature on the public key of said identity proof publishing node according to the private key of the higher-level identity proof publishing node; verifying the fourth digital signature according to the public key of the higher-level identity proof publishing node; and after the fourth digital signature passes the verification, determining whether the authenticated party node has mastered the private key corresponding to the public key of the authenticated party node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

The embodiment of the present disclosure further provides a user node 2, and the user node 2 includes:

the above-mentioned non-transitory computer readable storage medium 1; and one or more processors for executing the programs in the above-mentioned non-transitory computer readable storage medium 1.

The embodiment of the present disclosure further discloses another non-transitory computer readable storage medium 3, the non-transitory computer readable storage medium 3 includes one or more programs, said one or more programs are configured for executing a method for blockchain-based identity authentication, the method for blockchain-based identity authentication is applied to an authenticated party node, and the method for blockchain-based identity authentication includes: sending an authentication request to an authenticating party node, wherein the authentication request includes the identity information of the authenticated party node and the identity information of an identity proof publishing node; after the authenticating party node determines that the identity information of the authenticated party node, the identity information of the identity proof publishing node and a first digital signature obtained by the identity proof publishing node by performing digital signature on the identity information of the authenticated party node have been written into a blockchain, and after the first digital signature passes the verification of the authenticating party node, performing verification with the authenticating party node to determine whether the authenticated party node has mastered a private key corresponding to a public key of the authenticated party node; and in the case that the authenticating party node determines that the authenticated party node has mastered the private key corresponding to the public key of the authenticated party node, it is determined that the authenticated party node passes the identity authentication.

Alternatively, after the first digital signature passes the verification of the authenticating party node, performing verification with the authenticating party node to determine whether the authenticated party node has mastered a private key corresponding to a public key of the authenticated party node includes: after the first digital signature passes the verification of the authenticating party node, receiving verification information sent by the authenticating party node; performing digital signature on the verification information according to the private key of the authenticated party node to obtain a second digital signature; and sending the second digital signature to the authenticating party node, and in the case that the second digital signature passes the verification of the authenticating party node, it is determined that the authenticated party node has mastered the private key corresponding to the public key of the authenticated party node.

Alternatively, after the first digital signature passes the verification of the authenticating party node, performing verification with the authenticating party node to determine whether the authenticated party node has mastered a private key corresponding to a public key of the authenticated party node includes: after the first digital signature passes the verification of the authenticating party node, generating verification information according to a preset information generation rule, wherein the information generation rule is preset in the authenticated party node and the authenticating party node; performing digital signature on the verification information according to the private key of the authenticated party node to obtain a third digital signature; sending the verification information and the third digital signature to the authenticating party node; and in the case that the authenticating party node determines that the verification information is generated according to the information generation rule, and the verification of the authenticating party node on the third digital signature according to the public key of the authenticated party node is passed, it is determined that the authenticated party node has mastered the private key corresponding to the public key of the authenticated party node.

Alternatively, the method of the identity proof publishing node to write the identity information of the authenticated party node and the first digital signature in the blockchain includes: writing an identity proof request into the blockchain, wherein the identity proof request includes the identity information of the authenticated party node and is used by the identity proof publishing node to determine the identity information of the authenticated party node in the blockchain, performing digital signature on the identity information of the authenticated party node according to the private key of the identity proof publishing node to obtain the first digital signature, and writing the first digital signature into the blockchain.

Alternatively, after the identity proof publishing node writes a revocation proof of revoking the first digital signature into the blockchain, the first digital signature of the authenticated party node is revoked, the revocation proof includes revocation description of the first digital signature, and a fifth digital signature obtained by performing digital signature on the revocation proof through the private key of the identity proof publishing node.

Alternatively, the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

The embodiment of the present disclosure further provides another user node 4, and the user node 4 includes:

the above-mentioned non-transitory computer readable storage medium 3; and one or more processors for executing the programs in the above-mentioned non-transitory computer readable storage medium 3.

The embodiment of the present disclosure further provides an identity authentication system, including:

a blockchain;

at least one user node 1, serving as an authenticating party node;

at least one user node 4, serving as an authenticated party node; and at least one identity proof publishing node;

wherein said blockchain, said at least one user node 1, said at least one user node 4 and said at least one identity proof publishing node belong to the same blockchain network.

Figure 13:
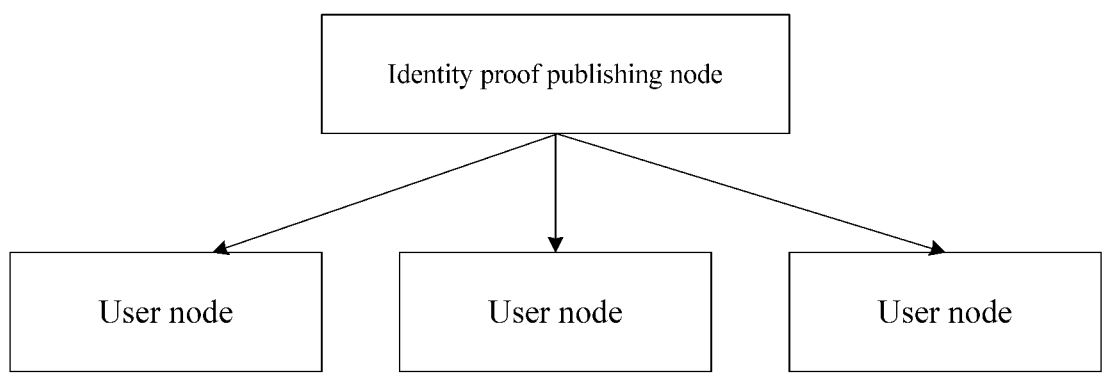
FIG. 13 is a structural block diagram of a system for identity authentication shown according to an embodiment.

Alternatively, in the system, the relationship between the identity proof publishing node and the user node may include the following three types:

In a first implementation manner, as shown in FIG. 13, FIG. 13 is a structural block diagram of an identity authentication system shown according to an embodiment. In FIG. 13, said at least one identity proof publishing node includes an identity proof publishing node, and the identity proof publishing node is configured for publishing an identity proof of each user node to the blockchain; and wherein with a first user node as an example, the first user node can be any user node, the identity proof publishing node publishing the identity proof of the first user node to the blockchain includes: the identity proof publishing node determines the identity information of the first user node in the blockchain, performs digital signature on the identity information of the first user node by using a private key of the identity proof publishing node, and writes the obtained digital signature into the blockchain.

Figure 14A:
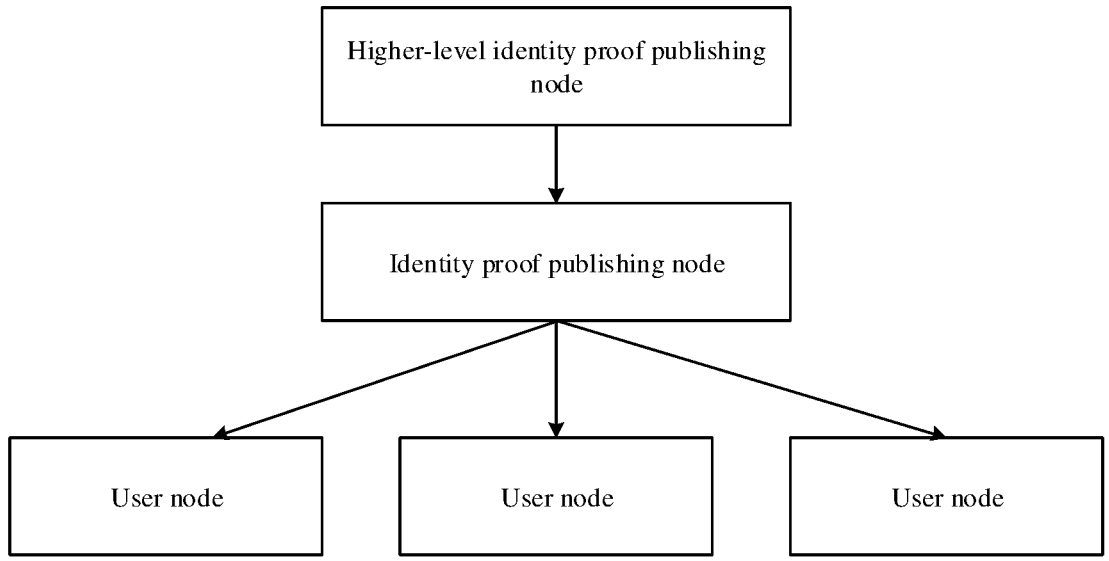
FIG. 14A is a structural block diagram of another system for identity authentication shown according to an embodiment.
Figure 14B:
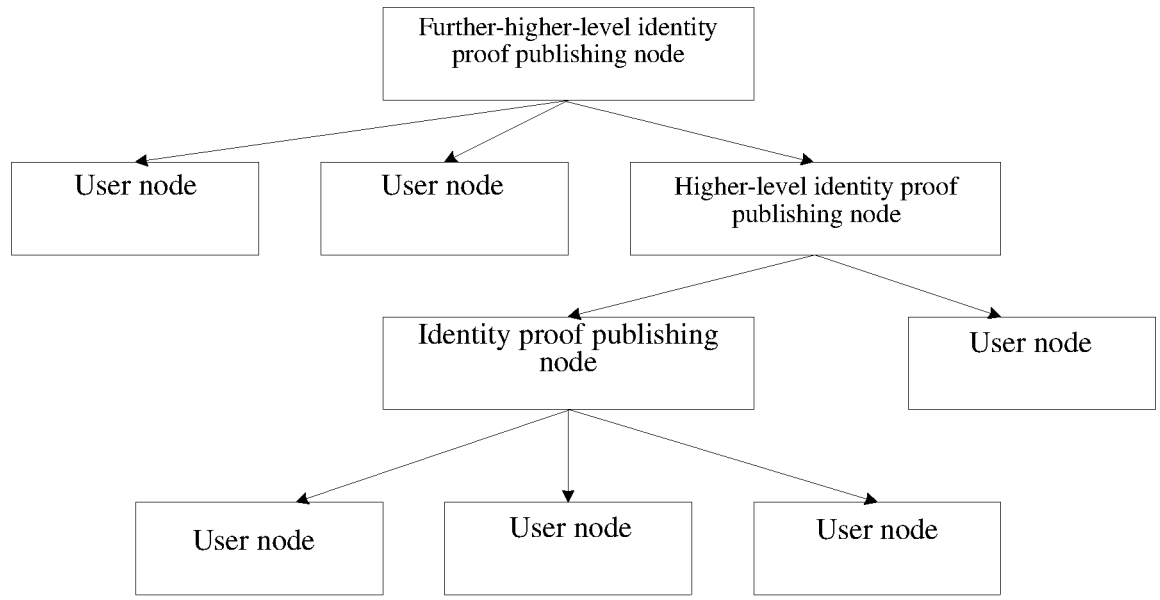
FIG. 14B is a structural block diagram of yet another system for identity authentication shown according to an embodiment.

In a second implementation manner, as shown in FIG. 14A, FIG. 14A is a structural block diagram of another identity authentication system shown according to an embodiment. In FIG. 14A, said at least one identity proof publishing node includes an identity proof publishing node and a higher-level identity proof publishing node immediately higher than said identity proof publishing node, said identity proof publishing node is configured for publishing the identity proof of each user node to the blockchain, and the higher-level identity proof publishing node is configured for publishing the identity proof of said identity proof publishing node to the blockchain. In addition, as shown in FIG. 14B, FIG. 14B is a structural block diagram of yet another identity authentication system shown according to an embodiment. In FIG. 14B, there may be a further higher level identity proof publishing node higher than above mentioned higher-level identity proof publishing node, and is referred to herein as an further-higher-level identity proof publishing node. The further-higher-level identity proof publishing node is configured for publishing the identity proof of the higher-level identity proof publishing node to the blockchain, moreover, the identity proof publishing node may not publish the identity proof of each user node, but the identity proof publishing node, the higher-level identity proof publishing node and the further-higher-level identity proof publishing node are respectively responsible for the publishing the identity proof of a part of user nodes. Moreover, the further-higher-level identity proof publishing node can serve as the identity proof publishing node of the other part of user nodes, of course, an identity proof publishing further higher may also exist, and so on, and will not be enumerated one by one.

With the first user node as an example, the first user node can be any user node, the identity proof publishing node publishing the identity proof of the first user node to the blockchain includes: the identity proof publishing node determines the identity information of the first user node in the blockchain, performs digital signature on the identity information of the first user node by using a private key of the identity proof publishing node, and writes the obtained digital signature into the blockchain. The higher-level identity proof publishing node publishing the identity proof of the identity proof publishing node to the blockchain includes: the higher-level identity proof publishing node performs digital signature on a public key of the identity proof publishing node according to the private key of the higher-level identity proof publishing node, and writes the obtained digital signature into the blockchain. The further-higher-level identity proof publishing node publishing the identity proof of the identity proof publishing node to the blockchain includes: the further-higher-level identity proof publishing node performs digital signature on the public key of the higher-level identity proof publishing node according to the private key of the further-higher-level identity proof publishing node, and writes the obtained digital signature into the blockchain.

In addition, the method of the higher-level identity proof publishing node or the further-higher-level identity proof publishing node to publish the identity proof of the user nodes to the blockchain is the same as the method of the identity proof publishing node to publish the identity proof of the first user node to the blockchain, and thus will not be repeated again.

Figure 15:
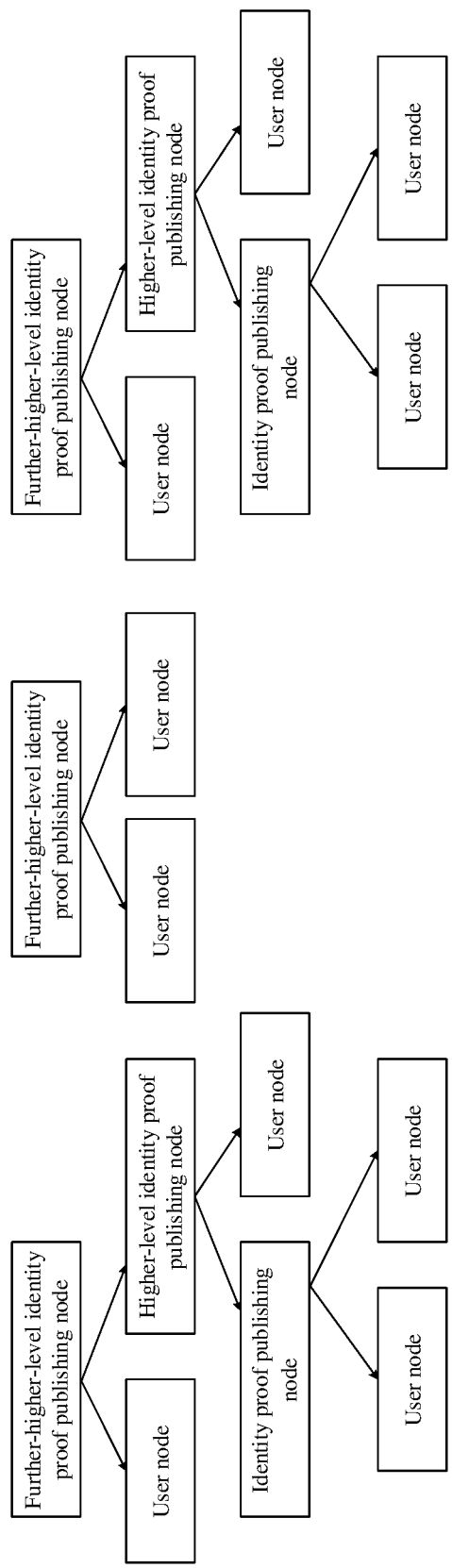
FIG. 15 is a structural block diagram of still yet another system for identity authentication shown according to an embodiment.

In a third implementation manner, as shown in FIG. 15, FIG. 15 is a structural block diagram of still yet another identity authentication system shown according to an embodiment. The identity authentication system can include a plurality of identity proof publishing subsystems, and each identity proof publishing subsystem may include at least one identity proof publishing node and at least one user node.

Wherein in the case that the first identity proof publishing subsystem includes an identity proof publishing node, the identity proof publishing node is configured for publishing the identity proof of the first user node of the first identity proof publishing subsystem to the blockchain, and the first user node is any user node in the first identity proof publishing subsystem; and the first identity proof publishing subsystem is any identity proof publishing subsystem in the plurality of identity proof publishing subsystems.

In the case that the first identity proof publishing subsystem at least includes an identity proof publishing node and a higher-level identity proof publishing node of the identity proof publishing node, the identity proof publishing node is configured for publishing the identity proof of the first user node of the first identity proof publishing subsystem to the blockchain, and the higher-level identity proof publishing node is configured for publishing the identity proof of the identity proof publishing node to the blockchain.

Wherein the identity proof publishing node publishing the identity proof of the first user node of the first identity proof publishing subsystem to the blockchain includes: the identity proof publishing node determines the identity information of the first user node in the blockchain, performs digital signature on the identity information of the first user node according to the private key of the identity proof publishing node, and writes the obtained digital signature into the blockchain.

The higher-level identity proof publishing node publishing the identity proof of the identity proof publishing node to the blockchain includes: the higher-level identity proof publishing node performs digital signature on the public key of the identity proof publishing node according to the private key of the higher-level identity proof publishing node, and writes the obtained digital signature into the blockchain. That is, it may be understood that each identity proof publishing subsystem may include the structure as shown in FIG. 13, FIG. 14A or FIG. 14B.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple variations all fall within the protection scope of the present disclosure.

It should be further noted that the specific technical features described in the above specific embodiments may be combined in any suitable manner without contradiction. In order to avoid unnecessary repetition, various possible combination manners are not additionally illustrated in the present disclosure.

In addition, various different embodiments of the present disclosure may be randomly combined as long as they do not deviate from the idea of the present disclosure, and the combinations should also be regarded as the content disclosed by the present disclosure.

The invention claimed is:

1. A method for blockchain-based identity authentication, applied to an authenticating party node, comprising: receiving an authentication request sent by an authenticated party node, wherein the authentication request includes identity information of the authenticated party node and identity information of an identity proof publishing node; in a case that it is determined that the identity information of the authenticated party node, the identity information of the identity proof publishing node, and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node; after the first digital signature passes the verification, determining whether the authenticated party node has mastered a private key corresponding to the public key of the authenticated party node, wherein the public key of the authenticated party node is obtained according to the identity information of the authenticated party node; and in a case that it is determined that the authenticated party node has mastered the private key corresponding to the public key of the authenticated party node, it is determined that the authenticated party node passes an identity authentication;

wherein in a case that there is a higher-level identity proof publishing node immediately higher than said identity proof publishing node, verifying the first digital signature according to the public key of the identity proof publishing node comprises:

obtaining a fourth digital signature from the blockchain, wherein the fourth digital signature is obtained by the higher-level identity proof publishing node by performing digital signature on the public key of the identity proof publishing node according to a private key of the higher-level identity proof publishing node;

verifying the fourth digital signature according to a public key of the higher-level identity proof publishing node, wherein the public key of the higher-level identity proof publishing node is obtained from the blockchain or is pre-stored; and after the fourth digital signature passes the verification, verifying the first digital signature according to the public key of said identity proof publishing node, wherein the public key of said identity proof publishing node is obtained from the blockchain or is pre-stored.

2. The method according to claim 1, wherein after the first digital signature passes the verification, determining whether the authenticated party node has mastered the private key corresponding to the public key of the authenticated party node comprises: after the first digital signature passes the verification, sending verification information to the authenticated party node; receiving a second digital signature obtained by the authenticated party node by performing digital signature on the verification information according to the private key of the authenticated party node; verifying the second digital signature according to the public key of the authenticated party node; and in a case that the second digital signature passes the verification, it is determined that the authenticated party node has mastered the private key corresponding to the public key of the authenticated party node.

3. The method according to claim 1, wherein after the first digital signature passes the verification, determining whether the authenticated party node has mastered the private key corresponding to the public key of the authenticated party node comprises: receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node; verifying whether the verification information is generated according to the information generation rule; in the case that the verification information is generated according to the information generation rule, verifying the third digital signature according to the public key of the authenticated party node; and in the case that the third digital signature passes the verification, it is determined that the authenticated party node has mastered the private key corresponding to the public key of the authenticated party node.

4. A method for blockchain-based identity authentication, applied to an authenticating party node, comprising:
receiving an authentication request sent by an authenticated party node, wherein the authentication request includes identity information of the authenticated party node and identity information of an identity proof publishing node;
in a case that it is determined that the identity information of the authenticated party node, the identity information of the identity proof publishing node, and a first digital signature obtained by the identity proof publishing node by performing digital signature on the identity information of the authenticated party node have been written into a blockchain, verifying the first digital signature according to a public key of the identity proof publishing node, wherein the public key of the identity proof publishing node is obtained according to the identity information of the identity proof publishing node;
after the first digital signature passes the verification, determining whether the authenticated party node has mastered a private key corresponding to the public key of the authenticated party node, wherein the public key of the authenticated party node is obtained according to the identity information of the authenticated party node; and
in a case that it is determined that the authenticated party node has mastered the private key corresponding to the public key of the authenticated party node, it is determined that the authenticated party node passes the identity authentication;
wherein prior to, after the first digital signature passes the verification, determining whether the authenticated party node has mastered the private key corresponding to the public key of the authenticated party node, the method further comprises: after the first digital signature passes the verification, obtaining a fourth digital signature from the blockchain, wherein the fourth digital signature is obtained by a higher-level identity proof publishing node by performing digital signature on the public key of said identity proof publishing node according to a private key of the higher-level identity proof publishing node; verifying the fourth digital signature according to a public key of the higher-level identity proof publishing node, wherein the public key of the higher-level identity proof publishing node is obtained from the blockchain or is pre-stored; and after the fourth digital signature passes the verification, determining whether the authenticated party node has mastered the private key corresponding to the public key of the authenticated party node.

5. The method according to claim 4, wherein the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

6. A method for blockchain-based identity authentication, applied to an authenticated party node, comprising: sending an authentication request to an authenticating party node, wherein the authentication request includes identity information of the authenticated party node and identity information of an identity proof publishing node; after the authenticating party node determines that the identity information of the authenticated party node, the identity information of the identity proof publishing node, and a first digital signature obtained by the identity proof publishing node by performing digital signature on the identity information of the authenticated party node have been written into a blockchain, and after the first digital signature passes the verification of the authenticating party node, performing verification with the authenticating party node to determine whether the authenticated party node has mastered a private key corresponding to a public key of the authenticated party node; and in a case that the authenticating party node determines that the authenticated party node has mastered the private key corresponding to the public key of the authenticated party node, it is determined that the authenticated party node passes the identity authentication;
wherein after the identity proof publishing node writes a revocation proof of revoking the first digital signature into the blockchain, the first digital signature of the authenticated party node is revoked, the revocation proof comprises revocation description of the first digital signature, and a fifth digital signature obtained by performing digital signature on a revocation description through the private key of the identity proof publishing node.

7. The method according to claim 6, wherein after the first digital signature passes the verification of the authenticating party node, performing verification with the authenticating party node to determine whether the authenticated party node has mastered a private key corresponding to a public key of the authenticated party node comprises: after the first digital signature passes the verification of the authenticating party node, receiving verification information sent by the authenticating party node; performing digital signature on the verification information according to the private key of the authenticated party node to obtain a second digital signature; and sending the second digital signature to the authenticating party node, and in a case that the second digital signature passes the verification of the authenticating party node, it is determined that the authenticated party node has mastered the private key corresponding to the public key of the authenticated party node.

8. The method according to claim 6, wherein after the first digital signature passes the verification of the authenticating party node, performing verification with the authenticating party node to determine whether the authenticated party node has mastered a private key corresponding to a public key of the authenticated party node comprises: after the first digital signature passes the verification of the authenticating party node, generating verification information according to a preset information generation rule, wherein the information generation rule is preset in the authenticated party node and the authenticating party node; performing digital signature on the verification information according to the private key of the authenticated party node to obtain a third digital signature; sending the verification information and the third digital signature to the authenticating party node; and in a case that the authenticating party node determines that the verification information is generated according to the information generation rule, and the verification of the authenticating party node on the third digital signature according to the public key of the authenticated party node is passed, it is determined that the authenticated party node has mastered the private key corresponding to the public key of the authenticated party node.

9. The method according to claim 6, wherein the method of the identity proof publishing node to write the identity information of the authenticated party node and the first digital signature in the blockchain comprises: writing an identity proof request into the blockchain, wherein the identity proof request includes the identity information of the authenticated party node and is used by the identity proof publishing node to determine the identity information of the authenticated party node in the blockchain, performing digital signature on the identity information of the authenticated party node according to the private key of the identity proof publishing node to obtain the first digital signature, and writing the first digital signature into the blockchain.

10. The method according to claim 6, wherein the identity information of the authenticated party node includes an account address of the authenticated party node or the public key of the authenticated party node, and the account address of the authenticated party node is obtained according to the public key of the authenticated party node; and the identity information of the identity proof publishing node includes the account address of the identity proof publishing node or the public key of the identity proof publishing node, and the account address of the identity proof publishing node is obtained according to the public key of the identity proof publishing node.

11. A non-transitory computer readable storage medium, wherein the non-transitory computer readable storage medium comprises one or more programs, and said one or more programs are configured for executing the method according to claim 1.

12. A user node, wherein the user node comprises: a storage storing computer program; and one or more processors configured to execute the program in the storage to perform the method according to claim 1.

13. A non-transitory computer readable storage medium, wherein the non-transitory computer readable storage medium comprises one or more programs, and said one or more programs are configured for executing the method of claim 6.

14. A user node, wherein the user node comprises: a storage storing computer program; and one or more processors configured to execute the program in the storage to perform the method according to claim 6.

15. The method according to claim 4, wherein after the first digital signature passes the verification, determining whether the authenticated party node has mastered a private key corresponding to the public key of the authenticated party node comprises:
   after the first digital signature passes the verification, sending verification information to the authenticated party node;
   receiving a second digital signature obtained by the authenticated party node by performing digital signature on the verification information according to the private key of the authenticated party node;
   verifying the second digital signature according to the public key of the authenticated party node; and
   in a case that the second digital signature passes the verification, it is determined that the authenticated party node has mastered the private key corresponding to the public key of the authenticated party node.

16. The method according to claim 4, wherein after the first digital signature passes the verification, determining whether the authenticated party node has mastered the private key corresponding to the public key of the authenticated party node comprises:
   receiving verification information sent by the authenticated party node and a third digital signature obtained by the authenticated party node by performing digital signature on the verification information according to the private key of the authenticated party node, wherein the verification information is generated by the authenticated party node according to a preset information generation rule, and the information generation rule is preset in the authenticated party node and the authenticating party node;
   verifying whether the verification information is generated according to the information generation rule;
   in a case that the verification information is generated according to the information generation rule, verifying the third digital signature according to the public key of the authenticated party node; and
   in a case that the third digital signature passes the verification, it is determined that the authenticated party node has mastered the private key corresponding to the public key of the authenticated party node.

* * * * *